UNITED STATES PATENT OFFICE.

JACOB AMBUHL, OF MORRISTOWN, NEW JERSEY.

COLORING AND HARDENING BRICKS.

SPECIFICATION forming part of Letters Patent No. 230,729, dated August 3, 1880.

Application filed December 10, 1879.

*To all whom it may concern:*

Be it known that I, JACOB AMBUHL, of Morristown, in the county of Morris and State of New Jersey, have invented a new and useful Improvement in Coloring and Hardening Bricks, which improvement is fully set forth in the following specification.

My invention consists, essentially, in mixing with the clay used in the manufacture of bricks a solution of sulphate of iron in water, for the purpose of coloring and hardening the bricks. The average proportion of sulphate of iron is one pound to each gallon of water; but this may be varied according to the richness of the clay in iron.

The solution is mixed with the clay in an appropriate manner, and then the clay is molded or pressed and kiln-dried in the usual manner. The clay used has mixed therewith, as is common, a suitable quantity of coal-dust. By the heat of the kiln and by the action of the coal mixed with the clay the sulphur is burned and driven off, leaving the oxide of iron combined with the clay, whereby the bricks obtain a rich color and are hardened.

It will be seen that by my invention one is enabled to manufacture bricks of very good quality from poor clay—namely, from clay that is poor or deficient in iron, the latter, as is well known, being the constituent to the presence of which, in greater or less quantity, the good color and degree of hardness of bricks depend.

I am aware that bricks have had coloring-matters of various kinds applied to their surfaces after being molded and before burning, and that ocher has been mixed with the clay in the "pug-mill" and "soak-pit" for the purpose of coloring the bricks all through; and I lay no claim to these modes of operation.

What I claim as new, and desire to secure by Letters Patent, is—

The within-described method of preparing clay for the manufacture of bricks, the same consisting in thoroughly intermixing or commingling with the clay a solution of sulphate of iron in water and then molding and burning the bricks, substantially as and for the purpose specified.

In testimony that I claim the foregoing I have hereunto set my hand and seal this 3d day of December, 1879.

JACOB AMBUHL. [L. S.]

Witnesses:
E. F. KASTENHUBER,
CHAS. WAHLERS.